United States Patent
Lin

(10) Patent No.: US 11,153,903 B2
(45) Date of Patent: Oct. 19, 2021

(54) METHOD FOR TRANSMITTING DATA AND TERMINAL DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/223,918

(22) Filed: Apr. 6, 2021

(65) Prior Publication Data

US 2021/0227576 A1    Jul. 22, 2021

Related U.S. Application Data

(63) Continuation of application No. PCT/CN2019/080240, filed on Mar. 28, 2019.

(51) Int. Cl.
| | | |
|---|---|---|
| *H04W 72/14* | (2009.01) | |
| *H04W 72/12* | (2009.01) | |
| *H04W 72/04* | (2009.01) | |
| *H04L 1/18* | (2006.01) | |

(52) U.S. Cl.
CPC .......... *H04W 72/14* (2013.01); *H04L 1/1896* (2013.01); *H04W 72/0446* (2013.01); *H04W 72/1242* (2013.01)

(58) Field of Classification Search
None
See application file for complete search history.

(56) References Cited

U.S. PATENT DOCUMENTS

| | | | |
|---|---|---|---|
| 9,479,297 B2* | 10/2016 | Graumann | ............ H04L 1/1874 |
| 2017/0223701 A1* | 8/2017 | Bendle | .............. H04W 72/1289 |

FOREIGN PATENT DOCUMENTS

CN        104579602 A      4/2015

OTHER PUBLICATIONS

3GPP TSG-RAN WG2 Meeting #104—R2-1816516—Spokane, USA, Nov. 12-16, 2018—Huawei, HiSilicon, Reliability enhancements for NR sidelink broadcast (4 pages).
3GPP TSG-RAN WG2 Meeting #104—R2-1816942—Spokane, USA, Nov. 12-16 2018—vivo, Interaction between MAC and PHY for intra-UE prioritization (6 pages).
3GPP TSG-RAN WG2 Meeting#104—R2-1817507—Revision of R2-1815450—Spokane, USA, Nov. 12-16, 2018—Huawei, HiSilicon, Collision between Configured and Dynamic grants (4 pages).
International Search Report dated Dec. 27, 2019 of PCT/CN2019/080240 (4 pages).

* cited by examiner

*Primary Examiner* — Hong S Cho
(74) *Attorney, Agent, or Firm* — Perkins Coie LLP

(57) ABSTRACT

Implementations of the present disclosure relate to a method for transmitting data and a terminal device. The method includes: if there is an untransmitted first MAC PDU in a target HARQ process, sending a third MAC PDU to a physical layer at an MAC layer, wherein, a first resource corresponding to the first MAC PDU overlaps with a second resource corresponding to a second MAC PDU, the third MAC PDU includes data in the first MAC PDU, and the physical layer is used for transmitting the third MAC PDU through a third resource.

20 Claims, 3 Drawing Sheets

200

If there is an untransmitted first MAC PDU in a target HARQ process, send a third MAC PDU to a physical layer at an MAC layer, wherein a first resource corresponding to the first MAC PDU overlaps with a second resource corresponding to a second MAC PDU, the third MAC PDU includes data in the first MAC PDU, and the physical layer is used for transmitting the third MAC PDU through a third resource — S210

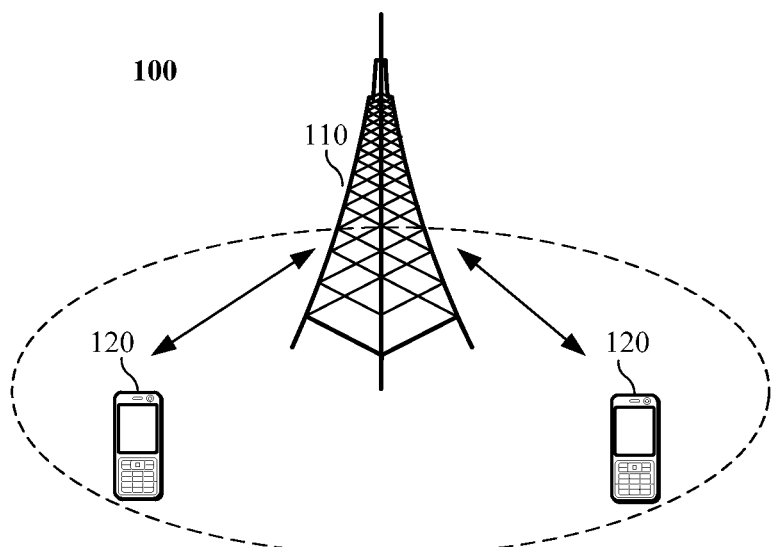

FIG. 1

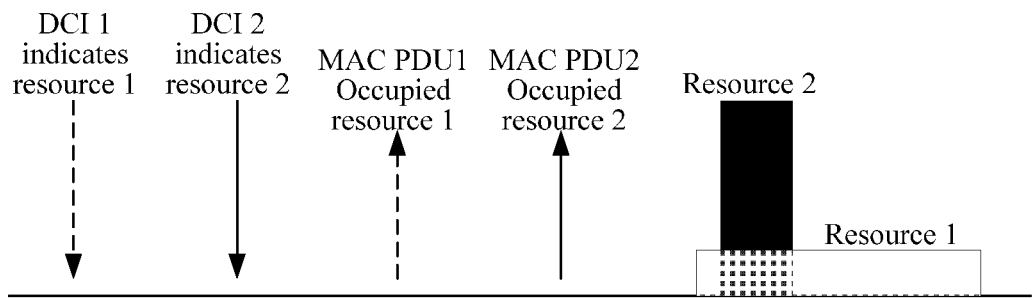

If there is an untransmitted first MAC PDU in a target HARQ process, send a third MAC PDU to a physical layer at an MAC layer, wherein a first resource corresponding to the first MAC PDU overlaps with a second resource corresponding to a second MAC PDU, the third MAC PDU includes data in the first MAC PDU, and the physical layer is used for transmitting the third MAC PDU through a third resource ∽ S210

FIG. 3

METHOD FOR TRANSMITTING DATA AND TERMINAL DEVICE

CROSS-REFERENCE TO RELATED APPLICATION

This application is a continuation application of International PCT Application No. PCT/CN2019/080240 filed on Mar. 28, 2019, the entire content of which is hereby incorporated by reference.

TECHNICAL FIELD

The present disclosure relates to the field of communication, in particular to a method for transmitting data and a terminal device.

BACKGROUND

In a 5G system, according to business requirements, it may be divided into three main application scenarios, which are respectively Enhanced mobile broadband (eMBB), Massive Machine Type Communications (mMTC) and Ultra reliability and low latency communication (uRLLC).

In the uRLLC scenario, due to existence of such a service with requirements on high reliability and low latency, a base station may schedule an uplink (UL) grant for an eMBB service, and then schedule an UL grant for the uRLLC, wherein the two grants partially overlap in time. Or, after the base station may schedule an UL grant for an uRLLC service, and then schedule an UL grant for another uRLLC with a different Quality of Service (QoS) requirement, wherein the two grants partially overlap in time. In addition, for the above scenario, two grants with overlapping parts in time may also be resources configured by the base station, such as configured grants.

At this time, an MAC entity may assemble each grant, but finally only one grant is to be transmitted to an opposite entity, for example, a user equipment only transmits one grant to a network side. That is, at this time, at a same time point, a Media Access Control (MAC) entity constitutes and generates two MAC Protocol Data Units (PDUs) for the two grants respectively, such as MAC PDU 1 and MAC PDU 2, which may respectively correspond to a Hybrid Automatic Repeat reQuest (HARQ) process 1 and a HARQ process 2. However, only one MAC PDU is transmitted, for example, the MAC PDU 2 and its corresponding HARQ process 2 are transmitted. The MAC entity, however, may not know which MAC PDU or grant is finally to be transmitted.

When a new transmission is scheduled later on the network side, or there is a configured grant which has a corresponding process number, process 1, since in the process there is MAC PDU 1 which is assembled but has not been sent, how to identify this scenario and how to deal with this scenario are currently unsolved problems.

SUMMARY

The present disclosure provides a method for transmitting data and a terminal device.

In a first aspect, a method for transmitting data is provided, including: sending a third MAC PDU to a physical layer at an MAC layer, if there is an untransmitted first MAC PDU in a target HARQ process, wherein a first resource corresponding to the first MAC PDU overlaps with a second resource corresponding to a second MAC PDU, the third MAC PDU includes data in the first MAC PDU, and the physical layer is used for transmitting the third MAC PDU through a third resource.

In a second aspect, a method for transmitting data is provided, including: sending a third MAC PDU to a physical layer at an MAC layer, if there is an untransmitted first MAC PDU in a target HARQ process, wherein the physical layer is used for transmitting the third MAC PDU through a third resource, wherein, a first resource corresponding to the first MAC PDU overlaps with a second resource corresponding to a second MAC PDU, a configured grant timer corresponding to the target HARQ process is running, and the third MAC PDU does not include data in the first MAC PDU.

In a third aspect, a terminal device is provided, configured to perform the method in any one of the above first to second aspects or in each implementation thereof. Specifically, the terminal device includes functional modules configured to perform the method in any one of the above first to second aspects or in each implementation thereof.

In a fourth aspect, a chip is provided, configured to implement the method in any one of the above first to second aspects or in each implementation thereof. Specifically, the chip includes a processor, configured to call and run a computer program from a memory, such that a device on which the chip is installed performs the method in any one of the above first to second aspects or in each implementation thereof. In a fifth aspect, a computer-readable storage medium is provided, configured to store a computer program that causes a computer to perform the method in any one of the above first to second aspects or in each implementation thereof.

In a sixth aspect, a computer program product is provided, including computer program instructions that cause a computer to perform the method in any one of the above first to second aspects or in each implementation thereof.

In a seventh aspect, a computer program is provided, causing, when being run on a computer, a computer to perform the method in any one of the above first to second aspects or in each implementation thereof.

BRIEF DESCRIPTION OF DRAWINGS

FIG. 1 is a schematic diagram of architecture of a communication system according to an implementation of the present disclosure.

FIG. 2 is a schematic diagram of a scenario of resource conflict according to an implementation of the present disclosure.

FIG. 3 is a schematic flowchart of a method for transmitting data according to an implementation of the present disclosure.

DETAILED DESCRIPTION

Figure 4:
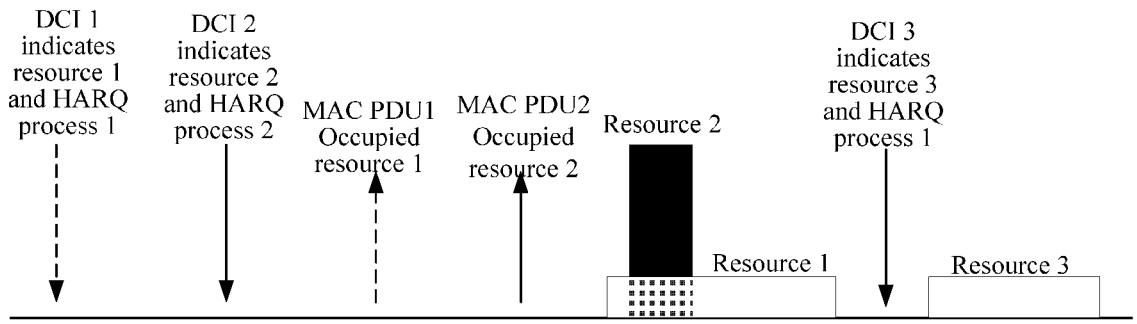
FIG. 4 is a schematic diagram of another scenario of resource conflict according to an implementation of the present disclosure.

Technical solutions in implementations of the present disclosure will be described below with reference to the drawings in implementations of the present disclosure. It is apparent that the implementations described are a part of implementations of the present disclosure, but not all implementations of the present disclosure. According to the implementations of the present disclosure, all other implementations obtained by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within a coverage range of the network device 110. As used herein, the term "terminal device" includes, but not limited to, an apparatus configured to receive/send a communication signal via a wired circuit connection, for example, via Public Switched Telephone Networks (PSTN), a Digital Subscriber Line (DSL), a digital cable, a direct cable connection; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal which may combine a cellular radio telephone and data processing, faxing, and data communication abilities, a Personal Digital Assistant (PDA) that may include a radio telephone, a pager, an Internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, a Device to Device (D2D) communication may be performed between the terminal devices 120.

Optionally, the 5G system or the 5G network may also be referred to as a New Radio (NR) system or an NR network.

FIG. 1 shows one network device and two terminal devices as an example. Optionally, the communication system 100 may include multiple network devices, and another quantity of terminal devices may be included within a coverage range of each network device, which is not limited in the implementations of the present disclosure.

Optionally, the communication system 100 may also include another network entity such as a network controller, a mobile management entity, or the like, which is not limited in the implementations of the present disclosure.

It should be understood that, a device with a communication function in a network/system in the implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The terminal device may also include another device in the communication system 100, e.g., another network entity such as a network controller, a mobile management entity, or the like, which is not limited in the implementations of the present disclosure.

It should be understood that the terms "system" and "network" may often be used interchangeably in this document. The term "and/or" in this document is merely an association relation describing associated objects, indicating that there may be three relations, for example, A and/or B may indicate three cases: A alone, both A and B, and B alone. In addition, the symbol "/" in this document generally indicates that objects before and after the symbol "/" have an "or" relation.

In an uRLLC topic of Release 15 of a 5G system, services with high reliability and low latency are taken into consideration and dealt with. In Release 16 (Rel-16), research objects were expanded, and researches on Factory automation, Transport Industry and Electrical Power Distribution were extended to the topic of 5G Industrial Internet of Things (IIoT). Thus a concept of Time sensitive network (TSN) is introduced. Finally, in the IIoT item, following several objects are considered: 1. TSN network-related enhancement; 2. priority within users; 3. Data duplication and multi-connectivity.

In conventional NR and LTE systems, for uplink dynamic scheduling, only one UL grant would be transmitted to a UE at a same time point. When there is a conflict between a dynamic scheduling resource and a configured grant resource, it is usually preferred to dynamically schedule transmission. At this time, selection of a priority may be determined by an MAC layer (i.e., MAC entity), and the MAC layer may select one of two grant resources, and only assemble the MAC PDU for the one grant.

However, under the sub-topic of priority within users, several possible existing scenarios of resource conflicts are determined, taking uplink transmission resources as an example, e.g., there are a conflict between a configured grant and a configured grant, a conflict between a dynamic grant and a dynamic grant, and a conflict between a dynamic grant and a configured grant.

Different scenarios correspond to different transmission requirements, such as dealing with a scenario with coexistence of multiple service types (such as coexistence of the eMBB and the uRLLC); or a scenario with coexistence of services of a same service type which have different characteristics (such as coexistence of uRLLC service 1 and uRLLC service 2 whose requirements on period latency are different); or that used for realizing service transmission with high reliability and low latency (for example multiple types of configured grants are configured for use in a same uRLLC service, such that there is an available grant resource at any time point to ensure timely transmission of uRLLC services).

However, in the uRLLC scenario, due to the existence of such a service requiring high reliability and low latency, the base station may schedule an UL grant for the uRLLC after scheduling an UL grant for the eMBB service, and two grants overlap in time. Or, the base station may schedule an UL grant for another uRLLC with a different QoS requirement after scheduling an UL grant of the uRLLC service, and two grants overlap in time. At this time, the MAC entity may assemble each grant, but only one grant is to be transmitted to an opposite entity finally, for example, the UE only transmits one grant to the network side. That is, at this time, at a same time point, the MAC entity constitutes and generates two MAC PDUs for the two grants, such as MAC PDU 1 and MAC PDU 2, which may correspond to Hybrid Automatic Repeat reQuest (HARQ) process 1 and HARQ process 2, respectively. However, only one MAC PDU is transmitted out, for example, the MAC PDU 2 and its corresponding HARQ process 2 are transmitted. The MAC entity, however, may not know which MAC PDU or grant is to be transmitted finally. In addition, for the above scenario, two grants with overlapping parts in time may also be resources configured by the base station, such as configured grants.

When a new transmission is scheduled later on the network side, or there is a configured grant which has a corresponding process number, process 1, since in the process there is MAC PDU 1 which is assembled but has not been sent, how to identify this scenario and how to deal with this scenario are a currently unsolved problem. If this untransmitted MAC PDU is directly discarded, it is very likely to cause a large number of services that should be transmitted to be discarded, which leads to a problem that the QoS of the services cannot be met and the use experience of services of the UE is reduced. For example, the uRLLC service 2 is in unacknowledged mode (UM), and MAC PDUs assembled at the MAC layer are directly lost, which will cause that the data cannot be recovered, QoS cannot be met, and survival time cannot be ensured. For example, if the former and the latter packets are both lost, the transmission of services will go wrong.

For example, FIG. 2 shows a schematic diagram of a scenario of a resource conflict in an implementation of the present disclosure. As shown in FIG. 2, it is assumed that the network device sends any one piece of Downlink Control Information (DCI) to the terminal device, for example, DCI 1, wherein the DCI 1 indicates resource 1; and in addition, a same network device or different network device also send DCI 2 to the terminal device, wherein the DCI 2 is used for indicating resource 2. The MAC layer generates MAC PDU 1 and MAC PDU 2 corresponding to the resource 1 and the resource 2 respectively, wherein the MAC PDU 1 corresponds to the resource 1 and the MAC PDU 2 corresponds to the resource 2. However, there is overlap between the resource 1 and the resource 2 in time domain and/or frequency domain. For example, as shown in FIG. 2, the terminal device may only send one of the MAC PDUs. For example, the terminal device only sends the MAC PDU 2, then how to deal with such scenario is a problem to be solved urgently at present. For example, how to deal with the MAC PDU 1 and the MAC layer does not know which MAC PDU is sent, and how to deal with the HARQ process or the MAC PDU 1 if a new transmission is scheduled later on the network side, or if there is a configured grant which has a corresponding process number identical to that of the MAC PDU 1 that has not been sent.

In addition, there is also a special restrictive condition of timer corresponding to the configured grant. Specifically, for a case that the grant is a configured grant, generally the MAC entity will only indicate the HARQ entity to use the configured grant for transmission if a corresponding configured Grant Timer is not running. That is, for each configured grant in each serving cell, if the configured grant is configured and activated, the MAC entity will perform following acts: if there is no overlap between a duration of a Physical Uplink Shared Channel (PUSCH) of a configured uplink grant and a PUSCH duration resource indicated by a Physical Downlink Control Channel (PDCCH) or a Random Access response (RAR), the HARQ process ID is set as the HARQ process ID associated with this PUSCH duration. Further, in a case that the configured Grant Timer of the HARQ process is not running, it is determined that a New Data Indication (NDI) bit of the corresponding HARQ process is flipped, and the configured UL grant and the corresponding HARQ information are delivered to a HARQ entity in the MAC layer.

However, if the PUSCH duration of the configured uplink grant overlaps with the PUSCH duration resource indicated by the PDCCH or RAR, the MAC layer generates two MAC PDUs for the two grants respectively, and only one MAC PDU can be transmitted, so how to deal with the untransmitted MAC PDU or the HARQ process corresponding to the untransmitted MAC PDU is also a problem to be solved urgently at present.

Therefore, an implementation of the present disclosure proposes a method for transmitting data which can be applied to the above scenarios of resource conflicts, solving a problem of how the MAC entity deals with an untransmitted MAC PDU, clarifying processing behavior of a UE, and ensuring integrity of protocol flow processing, and can avoid unnecessary packet loss.

FIG. 3 is a schematic flowchart of a method for transmitting data 200 according to an implementation of the present disclosure. The method 200 may be performed by a terminal device, for example, the terminal device may be the terminal device shown in FIG. 1. Specifically, the method 200 may be performed by an MAC entity included in the terminal device, in other words, the method 200 may be performed at an MAC layer of the terminal device. Specifically, as shown in FIG. 3, the method 200 includes: S210, if there is an untransmitted first MAC PDU in a target HARQ process, a third MAC PDU is sent to a physical layer at an MAC layer, wherein a first resource corresponding to the first MAC PDU overlaps with a second resource corresponding to a second MAC PDU, and the third MAC PDU includes data in the first MAC PDU, and the physical layer is used for transmitting the third MAC PDU through the third resource.

It should be understood that the resource in the implementation of the present disclosure may refer to a grant, or a Uplink Shared Channel (UL-SCH), or a PUSCH, wherein the resource includes the first resource, the second resource and the third resource.

It should be understood that the first resource corresponding to the first MAC PDU in implementations of the present disclosure may be a dynamic scheduling resource or a configured grant resource, that is, the first resource may be a dynamic grant or a configured grant. In addition, the first resource may refer to a time domain and/or frequency domain resource of any size; and the first resource may refer to a continuous or a discontinuous resource, which is not limited in the implementations of the present disclosure.

Similarly, the second resource corresponding to the second MAC PDU in implementations of the present disclosure may also be a dynamic grant or a configured grant. In addition, the second resource may also refer to a time domain and/or frequency domain resource of any size; and the second resource may refer to a continuous or discontinuous resource.

Similarly, the third resource in implementations of the present disclosure may also be a dynamic grant or a configured grant. In addition, the third resource may also refer to a time domain and/or frequency domain resource of any size; and the third resource may refer to a continuous or discontinuous resource.

In addition, the first resource overlaps with the second resource, which may mean that the first resource and the second resource partially overlap or completely overlap in the time domain and/or the frequency domain.

In an implementation of the present disclosure, the method 200 may further include: the first MAC PDU and the second MAC PDU are generated at the MAC layer, wherein the first MAC PDU corresponds to the first resource and the second MAC PDU corresponds to the second resource. Therefore, due to a conflict between the first resource and the second resource, the terminal device can only choose to send one of the first MAC PDU and the second MAC PDU to a receiving end (e.g., network device). Here, assuming that the second MAC PDU is sent to the receiving end, the method 200 further includes: the second MAC PDU is sent to the physical layer at the MAC layer, such that the physical layer transmits the second MAC PDU through the second resource; but for the first MAC PDU, the MAC layer may not send the first MAC PDU to the physical layer, or, the method 200 may further include that the first MAC PDU is sent to the physical layer at the MAC layer, but the physical layer does not send the second MAC PDU due to the conflict between the first resource and the second resource.

At this time, if the network side schedules a new transmission later, or there is a configured grant, that is, the terminal device determines the third resource, wherein the third resource may be a dynamic grant or a configured grant, then the third MAC PDU may be sent to the physical layer at the MAC layer, such that the physical layer transmits the third MAC PDU through the third resource. Herein, the third MAC PDU includes data in the first MAC PDU. For example, the data in the first MAC PDU may include an MAC SDU in the first MAC PDU, that is, the third MAC PDU includes the MAC SDU in the first MAC PDU. Optionally, the third MAC PDU may also include a MAC CE in the first MAC PDU.

For example, FIG. 4 shows a schematic diagram of a scenario of a resource conflict according to an implementation of the present disclosure. As shown in FIG. 4, it is assumed that the first resource is indicated by the network device through DCI 1 and the first resource corresponds to HARQ process 1, and the second resource is indicated by the network device through DCI 2 and the second resource corresponds to HARQ process 2. The MAC layer of the terminal device generates MAC PDU 1, which corresponding to that a resource 1 needs to be occupied, and generates MAC PDU 2, which corresponding to that a resource 2 needs to be occupied. However, since the resource 1 overlaps with the resource 2, for example, they overlap as shown in FIG. 2, here, assuming that the terminal device chooses to send MAC PDU 2, then there is an unsent MAC PDU 1 in HARQ process 1, that is, the HARQ process 1 is a target HARQ process in the implementation of the present disclosure, and there is an unsent first MAC PDU, i.e. MAC PDU 1 in the target HARQ. At this time, the terminal device receives DCI 3 sent by the network device, and the DCI 3 indicates a resource 3, and the resource 3 also corresponds to the HARQ process 1, but there is still an unsent MAC PDU 1 in the HARQ process 1, then the terminal device may send MAC PDU 3 through the resource 3, wherein the MAC PDU 3 includes the MAC SDU in the MAC PDU 1. Optionally, the MAC PDU3 may also include the MAC CE in MAC PDU 1.

It should be understood that in the implementation of the present disclosure, the data of the first MAC PDU included in the third MAC PDU may include the MAC SDU in the first MAC PDU, that is, the third MAC PDU includes the MAC SDU in the first MAC PDU. For example, the third MAC PDU may be obtained after the first MAC PDU is reassembled, for example, the third MAC PDU is obtained after the MAC SDU in the first MAC PDU is reassembled with another MAC SDU; for example, the third MAC PDU may be obtained after the first MAC PDU is reassembled, for example, the third MAC PDU is obtained after the MAC SDU in the first MAC PDU is reassembled with padding; or, the third MAC PDU may also be the first MAC PDU, that is, the first MAC PDU and the third MAC PDU are the same MAC PDU; or, the third MAC PDU may also include the first MAC PDU and a padding bit, which is not limited in the implementation of the present disclosure. Furthermore, if there is reassembly, the MAC layer needs to indicate a Multiplexing and assembly entity to contain the data of the first MAC PDU, such as the MAC SDU, in the third MAC PDU or a transmission of the third resource. Further, the MAC layer acquires the third MAC PDU from the Multiplexing and assembly entity.

In following, how to send the third MAC PDU in different scenarios will be described in detail with reference to several specific implementations.

Optionally, as an implementation, the third MAC PDU includes the MAC SDU in the first MAC PDU, which may mean that the third MAC PDU is obtained, after the MAC layer reassembles the first MAC PDU. Specifically, the third MAC PDU may be obtained, after the MAC layer reassembles the first MAC PDU through an MAC Multiplexing and assembly entity. For example, after the Multiplexing and assembly entity reassembles the first MAC PDU, the third MAC PDU is obtained, wherein the third MAC PDU may include at least one MAC subPDU, and the at least one MAC sub PDU carries the MAC SDU in the first MAC PDU acquired from the target HARQ process.

In the present implementation, the terminal device may obtain the third MAC PDU after the MAC layer reassembles the first MAC PDU, in a case that a first condition is met. Herein, the first condition includes at least one of following conditions: a size of the third resource does not match a size of the first MAC PDU; according to a first Transport Block (TB) in the target HARQ process, it is determined that a New Data Indication (NDI) corresponding to the target HARQ process is flipped, wherein the first TB corresponds to the first resource; there is the untransmitted first MAC PDU in the target HARQ process; the first resource corresponding to the first MAC PDU which exists in the target HARQ process is not transmitted; the first resource overlaps with the second resource; the NDI corresponding to the target HARQ process is flipped; the first TB in the target HARQ process is not transmitted; indication information sent by the physical layer is received at the MAC layer, wherein the indication information indicates that the first MAC PDU in the target HARQ process is not transmitted; the first resource and/or the third resource are configured grant resources; a configured grant timer corresponding to the target HARQ process is running; a priority of the third resource is higher than a priority of the first resource; the third resource is a preemption resource; a priority of the second resource is higher than the priority of the first resource; the second resource is transmitted prior to the first resource; and a HARQ process number corresponding to the first resource and a HARQ process number corresponding to the third resource are same.

Herein, for the case that the first condition includes that the size of the third resource does not match the size of the first MAC PDU, for example, the size of the third resource is larger than that of the first MAC PDU, then after the MAC SDU in the first MAC PDU may be reassembled with another MAC SDU at the MAC layer, it may be transmitted through the third resource. For another example, the size of the third resource is larger than that of the first MAC PDU, then after the MAC SDU in the first MAC PDU may be reassembled with the MAC CE at the MAC layer, it may be transmitted through the third resource. For another example, the size of the third resource is larger than that of the first MAC PDU, then after the MAC SDU in the first MAC PDU may be reassembled with padding at the MAC layer, it may be transmitted through the third resource. Or, the reassembly may be made by any combination of these several modes, and then transmission is made through the third resource. In this way, the third resource may also be fully utilized to avoid waste of a resource.

For the case that the first condition includes that the terminal device determines that the NDI corresponding to the target HARQ process is flipped, for example, it may be determined whether the NDI corresponding to the target HARQ process is flipped according to the first TB in the target HARQ process, wherein the first TB corresponds to the first resource. Specifically, if the NDI is flipped, it means that the third resource is used for transmitting new data instead of retransmitting data, then the third MAC PDU including the data in the first MAC PDU may be transmitted through the third resource. Contrary to this case, if the NDI is not flipped, it means that the third resource is used for transmitting retransmission data, and the terminal device may determine whether to send the third MAC PDU according to another condition in the first condition, or, the terminal device may send retransmission data corresponding to the third resource without reassembling the first MAC PDU through the Multiplexing and assembly entity, but the implementations of the present disclosure are not limited thereto.

For the case that the first condition includes determining that there is the untransmitted first MAC PDU in the target HARQ process, the MAC layer of the terminal device may determine whether there is the untransmitted first MAC PDU in the target HARQ process in various modes. For example, the MAC layer may determine that there is the untransmitted first MAC PDU in the target HARQ process by interacting with the physical layer, for example, the first condition may include receiving indication information sent by the physical layer at the MAC layer, wherein the indication information indicates that the first MAC PDU in the target HARQ process is not transmitted.

For another example, the MAC layer may also determine that there is the untransmitted first MAC PDU in the target HARQ process by a preset rule. For example, if the first resource of the first MAC PDU conflicts with the second resource of the second MAC PDU, and the preset rule indicates that only MAC PDU that the time domain is on the latter is sent, then the MAC layer may determine that the first MAC PDU that the time domain is on former exists in the target HARQ process and has not been transmitted. For another example, if the first resource of the first MAC PDU conflicts with the second resource of the second MAC PDU, the MAC layer determines the MAC PDU not to be sent according to a grant attribute. For another example, if the first resource of the first MAC PDU conflicts with the second resource of the second MAC PDU, the MAC determines which grant to be sent and further determines the unsent MAC PDU. For another example, the MAC layer may determine which one of the first MAC PDU and the second MAC PDU to be sent, that is, the MAC layer determines to send the second MAC PDU instead of the first MAC PDU, then the MAC layer may determine that there is the first MAC PDU that has not been transmitted in the target HARQ process, but the implementations of the present disclosure are not limited thereto.

Similar to determining that there is the untransmitted first MAC PDU in the target HARQ process, the first condition may also include determining that the first resource corresponding to the first MAC PDU existing in the target HARQ process is not transmitted, and/or, the first condition may also include that the first TB in the target HARQ process is not transmitted.

For a case that the first condition includes that the first resource overlaps with the second resource, that is, the first resource is a conflicted or overlapped resource; or, it may also be described as: the first TB overlaps or conflicts with the second TB, that is, the first TB is conflicted or overlapped, wherein the first TB corresponds to the first MAC PDU and the second TB corresponds to the second MAC PDU, that is, the first TB occupies the first resource and the second TB occupies the second resource; or, it may also be described as: the transmission of the first TB conflicts or overlaps with the transmission of the second TB, that is, the transmission of the first TB is conflicted or overlapped, but the implementations of the present disclosure are not limited thereto.

For a case that the first condition includes that the configured grant timer corresponding to the target HARQ process is running, generally, if the first resource is a configuration grant resource and/or the third resource is a configuration grant resource, the configured grant timer corresponding to the target HARQ process may be running; or, in a case that the first resource or the third resource is a dynamic scheduling resource, the configured grant timer corresponding to the target HARQ process may also be running. Specifically, if the configured grant timer corresponding to the target HARQ process is running, combined with another condition in the first condition, for example, for a case that there is the first MAC PDU untransmitted in the target HARQ process, or there is an assembled first MAC PDU in the target HARQ process, while the first resource corresponding to the first MAC PDU is not transmitted, then the MAC layer may still send the third resource and related information of the target HARQ to the HARQ entity, such that the HARQ entity sends the third MAC PDU to the physical layer, such that the physical layer sends the third MAC PDU through the third resource.

For a case that the first condition includes that the priority of the third resource is higher than that of the first resource, for example, the third resource may be a preemption resource. For a case that the first condition includes that the second resource is transmitted prior to the first resource, for example, the priority of the second resource may be higher than that of the first resource. Because the first resource conflicts with the second resource, and the second resource is transmitted preferentially, the first resource is not transmitted, resulting in that there is an untransmitted first MAC PDU in the target HARQ process.

For a case that the first condition includes that the HARQ process number corresponding to the first resource and the HARQ process number corresponding to the third resource are same, it may be determined to use the third resource to transmit the third MAC PDU which includes the data in the first MAC PDU in combination with another condition in the first condition.

Optionally, the first condition may also include: if the HARQ processes of the first MAC PDU and the second MAC PDU are same, then in a time order, the former MAC PDU may be reserved and the other MAC PDU may be sent. For example, the former MAC PDU is the first MAC PDU, then the second MAC PDU is sent. Contrary to this case, if the HARQ processes of the first MAC PDU and the second MAC PDU are same, then in a time order, the former MAC PDU may be flushed and the latter MAC PDU may be sent. For example, if the former MAC PDU is the first MAC PDU, then the latter second MAC PDU is sent and the first MAC PDU is flushed. At this time, in the corresponding HARQ process there is no MAC PDU which is not sent.

Similarly, the first condition may also include: if the HARQ processes of the first MAC PDU and the second MAC PDU are same, one of the first MAC PDU and the second MAC PDU may be selected to be sent according to another rule, for example, the second MAC PDU is sent, and then the other MAC PDU is reserved, that is, the first MAC PDU is reserved. Contrary to this case, if the HARQ processes of the first MAC PDU and the second MAC PDU are same, one of them may be selected to be sent according to a certain rule, for example, the second MAC PDU is sent, then for the other MAC PDU, that is, the first MAC PDU, the first MAC PDU may be flushed.

Optionally, for a case that the configured grant timer corresponding to the target HARQ process is running, the method 200 may further include: the MAC layer determines that the NDI corresponding to the target HARQ process is flipped, and/or, the third resource is sent to the HARQ entity at the MAC layer. Or, in combination with the third condition, when the configured grant timer corresponding to the target HARQ process is running and the third condition is met, the MAC layer may determine that the NDI corresponding to the target HARQ process is flipped, and/or, the third resource is sent to the HARQ entity at the MAC layer. Herein, the third condition includes at least one of following conditions: the first resource and/or the third resource are configured grant resources; it is determined there is the untransmitted first MAC PDU in the target HARQ process; the first resource corresponding to the first MAC PDU which exists in the target HARQ process is not transmitted; it is determined that the first resource overlaps with the second resource; the first TB in the target HARQ process is not transmitted; the priority of the second resource is higher than the priority of the first resource; the second resource is transmitted prior to the first resource; the third resource is a preemption resource; the HARQ process number corresponding to the first resource and the HARQ process number corresponding to the third resource are same.

Or, the third condition may also include: if the HARQ processes of the first MAC PDU and the second MAC PDU are same, then in a time order, the former MAC PDU may be reserved, and the other MAC PDU may be sent. Contrary to this case, if the HARQ processes of the first MAC PDU and the second MAC PDU are same, then in a time order, the former MAC PDU may also be flushed and the latter MAC PDU may be sent.

Similarly, the third condition may also include: if the HARQ processes of the first MAC PDU and the second MAC PDU are same, then according to another rule, one of the first MAC PDU and the second MAC PDU may be selected to be sent, and the other MAC PDU may be reserved. Contrary to this case, if the HARQ processes of the first MAC PDU and the second MAC PDU are same, then according to a certain rule, one of the first MAC PDU and the second MAC PDU may be selected to be sent and the other MAC PDU may be flushed.

It should be understood that for a case that a condition which may be included in the third condition belongs to a condition which may be included in the first condition, the above description about the first condition is applied, which will not be repeated here for sake of brevity.

It should be understood that the third condition may be used together with the first condition, that is, both the first condition and the third condition are set.

Or, the third condition may also be set separately, that is, only the third condition is set, and when the third condition is met, the acts corresponding to the third condition are performed. Since the first condition is not set, at this time the acts corresponding to the first condition may be directly performed, or whether to perform the acts corresponding to the first condition may be determined in another mode. For example, whether to reassemble the first MAC PDU at the MAC layer to obtain the third MAC PDU and send the third MAC PDU is determined in another mode. Or, in a case that the first condition is not set, the acts corresponding to the first condition may not be performed either. For example, the first condition is not set, and reassembling the first MAC PDU at the MAC layer to obtain the third MAC PDU is not performed either.

Or, similarly, the first condition may also be set separately, that is, only the first condition is set, and in a case that the first condition is met, the acts corresponding to the first condition are performed. Since the third condition is not set, at this time the acts corresponding to the third condition may be directly performed, or whether to perform the acts corresponding to the third condition may be determined in another mode. For example, it is determined in another mode that the MAC layer determines whether the NDI corresponding to the target HARQ process is flipped, and whether to send the third resource to the HARQ entity at the MAC layer. Or, in a case that the third condition is not set, the acts corresponding to the third condition may not be performed. For example, if the third condition is not set, at least one of following is not performed: the MAC layer determines whether the NDI corresponding to the target HARQ process is flipped, and the MAC layer sends the third resource to the HARQ entity, but the implementations of the present disclosure are not limited thereto this.

Optionally, as another implementation, the MAC SDU in the first MAC PDU being included in the third MAC PDU may also refer to that the third MAC PDU is the first MAC PDU, or the third MAC PDU includes the first MAC PDU and a padding bit. Specifically, in a case that the second condition is met, the terminal device may send the third MAC PDU to the physical layer at the MAC layer, wherein the third MAC PDU is the first MAC PDU, or the third MAC PDU includes the first MAC PDU and a padding bit.

Herein, the second condition includes at least one of following conditions: a size of the third resource matches a size of the first MAC PDU; according to a first TB in the target HARQ process, it is determined that the NDI corresponding to the target HARQ process is flipped, wherein the first TB corresponds to the first resource; there is the untransmitted first MAC PDU in the target HARQ process; the first resource corresponding to the first MAC PDU which exists in the target HARQ process is not transmitted; the first resource overlaps with the second resource; indication information sent by the physical layer is received at the MAC layer, and the indication information indicates that the first MAC PDU in the target HARQ process is not transmitted; the first resource and/or the third resource are configured grant resources; the configured grant timer corresponding to the target HARQ process is running; the NDI corresponding to the target HARQ process is flipped; the first TB in the target HARQ process is not transmitted; the priority of the third resource is higher than the priority of the first resource; the third resource is a preemption resource; the priority of the second resource is higher than the priority of the first resource; the second resource is transmitted prior to the first resource; the HARQ process number corresponding to the first resource and the HARQ process number corresponding to the third resource are same.

Or, the second condition may also include: if the HARQ processes of the first MAC PDU and the second MAC PDU are same, then in a time order, the former MAC PDU may be reserved, and the other MAC PDU may be sent. Contrary to this case, if the HARQ processes of the first MAC PDU and the second MAC PDU are same, then in a time order, the former MAC PDU may be flushed and the latter MAC PDU may be sent.

Similarly, the second condition may also include: if the HARQ processes of the first MAC PDU and the second MAC PDU are same, one of the first MAC PDU and the second MAC PDU may also be selected to be sent according to another rule, and the other MAC PDU may be reserved. Contrary to this case, if the HARQ processes of the first MAC PDU and the second MAC PDU are same, then according to a certain rule, one of the first MAC PDU and the second MAC PDU may also be selected to be sent and the other MAC PDU may be flushed.

It should be understood that there is part of conditions in various conditions which may be included in the second condition that belongs to the conditions which may be included in the first condition, thus the above description about the first condition is also applied, which will not be repeated here for sake of brevity.

Different from the first condition, the second condition may include: if the size of the third resource matches the size of the first MAC PDU, then the MAC layer may directly send the first MAC PDU to the physical layer, such that the physical layer uses the third resource to send the first MAC PDU; or, after padding is added to the first MAC PDU, the first MAC PDU is sent through the physical layer.

Optionally, similar to the previous implementation, in the implementation, for the above case that the configured grant timer corresponding to the target HARQ process is running, the method 200 may also include: the MAC layer determines that the NDI corresponding to the target HARQ process is flipped, and/or, the third resource is sent to the HARQ entity at the MAC layer. Or, in combination with the third condition, when the configured grant timer corresponding to the target HARQ process is running and the third condition is met, the MAC layer determines that the NDI corresponding to the target HARQ process is flipped, and/or, the third resource is sent to the HARQ entity at the MAC layer.

Herein, for the description about that the condition which may be included in the third condition is applicable to the condition which may be included in the third condition in the previous implementation, which will not be repeated here for sake of brevity.

In addition, the third condition and the second condition may also be used in combination or separately. Herein, when the third condition is used alone, the second condition is not set, and correspondingly the acts corresponding to the second condition may be directly performed, or whether to perform the acts corresponding to the second condition may be determined in another mode. For example, the second condition is not set, whether to send the third MAC PDU to the physical layer at the MAC layer is determined in another mode, wherein, the third MAC PDU is the first MAC PDU, or the third MAC PDU includes the first MAC PDU and a padding bit. Or, in the case that the second condition is not set, the acts corresponding to the second condition may not be performed either. For example, the second condition is not set, and sending the third MAC PDU to the physical layer at the MAC layer is not performed, wherein the third MAC PDU is the first MAC PDU, or the third MAC PDU includes the first MAC PDU and a padding bit.

Similarly, for the case that the second condition is used alone, the third condition is not set, and correspondingly the acts corresponding to the third condition may be directly performed, or whether to perform the acts corresponding to the third condition may be determined in another mode. For example, the third condition is not set, it is determined that the MAC layer determines whether the NDI corresponding to the target HARQ process is flipped and whether to send the third resource to the HARQ entity at the MAC layer is determined in another mode. Or, in a case that the third condition is not set, the acts corresponding to the third condition may not be performed either. For example, if the third condition is not set, at least one of following is not performed: the MAC layer determines whether the NDI corresponding to the target HARQ process is flipped, and the MAC layer sends the third resource to the HARQ entity, but the implementations of the present disclosure are not limited thereto this.

For the above two implementations, description will be given below with examples with reference to different cases.

For example, for each uplink grant, the HARQ entity will perform following acts, wherein the uplink grant may be a configured grant resource or a dynamic scheduling resource.

Act 1, HARQ processes related to a whole grant are determined, and act 2 is performed for each determined HARQ process, for example, any case of following acts 2 may be performed.

Act 2, if the received grant is scheduled by a PDCCH which is not scrambled by TC-RNTI, a previous TB transmission of this HARQ process is compared and it is determined that a NDI of the corresponding HARQ process is flipped. Or, if the received grant is scheduled by a PDCCH scrambled by C-RNTI, and the HARQ buffer of the corresponding process is empty. Or, if the UL grant is received in an RAR. Or, if the UL grant is indicated by the PDCCH scrambled by C-RNTI received in an RAR Window, and the PDCCH successfully completes an RA process triggered by a Beam Failure Recovery (BFR). Or, if the UL grant is part of a configured UL grant bundle, and according to protocol 6.1.2.3 of TS 38.214 [7], the UL grant may be used for initial transmission, and no MAC PDU has been acquired for the bundle. It is judged whether at least one of the above cases or conditions is met, and if yes, continuing to perform act 3.

Act 3, if there is an MAC PDU in Msg3 buffer and the UL grant is acquired from the RAR. Or, if there is an MAC PDU in Msg3 buffer, and the UL grant is indicated by the PDCCH scrambled by the C-RNTI received within the RAR Window, and the PDCCH successfully completes the RA process triggered by BFR. It is judged whether at least one of the above cases or conditions is met, and if yes, continuing to perform act 4.

Act 4, acquiring the MAC PDU from the Msg3 buffer.

Further, act 4 may be continually performed: if a size of the UL grant does not match a size of the acquired MAC PDU, and if the RA process is successfully completed after receiving this UL grant, continuing to perform act 5.

Act 5, a Multiplexing and assembly entity is indicated to contain MAC subPDU(s) in the subsequent uplink transmission, wherein the MAC subPDU(s) carries the MAC SDU which is from the acquired MAC PDU; and an reassembled MAC PDU is acquired from the multiplexing and assembly entity.

Optionally, if neither of the above conditions in act 3 is met, act 6 may be continually performed after act 2. Act 6, if there is an assembled MAC PDU in the corresponding HARQ process, but the grant corresponding to the MAC PDU is not transmitted, and the size of the UL grant does not match the size of the MAC PDU acquired from the identified HARQ process, then continuing to perform act 7.

Act 7, the Multiplexing and assembly entity is indicated to contain the MAC subPDU(s) in the subsequent uplink transmission, wherein the MAC subPDU(s) carries the MAC SDU from the acquired MAC PDU; and the MAC PDU is acquired from the multiplexing and assembly entity.

Optionally, the above act 6 may also be replaced with following two cases.

In case 1, act 6, if there is an assembled MAC PDU in the corresponding HARQ process, but the grant corresponding to the MAC PDU is not transmitted, then continuing to perform act 7.

In this case, the MAC PDU is reassembled regardless of whether the size of the resource and the size of the MAC PDU are same. Its advantage lies in consistent processing of all cases, which reduces complexity of processing of a UE.

In case 2, act 6, if there is an assembled MAC PDU in the corresponding HARQ process, but the grant corresponding to the MAC PDU is not transmitted, and the size of the UL grant does not match the size of the MAC PDU acquired from the identified HARQ process, then continuing to perform act 7.

In case 3, act 6, if there is an assembled MAC PDU in the corresponding HARQ process, but the grant corresponding to the MAC PDU is not transmitted, and the size of the UL grant matches the size of the MAC PDU acquired from the identified HARQ process, then act 7 is replaced by: the acquired MAC PDU is the untransmitted MAC PDU stored in the identified HARQ process.

In case 2 and case 3, the acquisition of MAC PDU is clearly defined for different cases, which ensures the retransmission of the untransmitted MAC PDU, avoids unnecessary packet loss, and ensures the QoS of services as much as possible.

Optionally, if neither of the above act 3 and act 6 is met, in the case that there is an MAC PDU to be transmitted, the MAC PDU is acquired from the multiplexing and assembly entity for transmission;

In addition, as another implementation, for configured grant resources, that is, for each configured grant of each serving cell, if transmission resources are configured and activated, the MAC entity will perform following acts.

Act 1, if a first PUSCH duration of a configured uplink grant and a second PUSCH duration resource indicated by a PDCCH or an RAR do not overlap, act 2 is continued to be performed.

Act 2, the HARQ process ID is set as a HARQ process ID associated with the first PUSCH duration. In addition, act 2 may also further include: if the configured Grant Timer of the corresponding HARQ process is not running, act 3 is continued to be performed; or, if the configured Grant Timer of the corresponding HARQ process is running, and there is an assembled MAC PDU in the corresponding HARQ process but the MAC PDU is not transmitted, at least one of act 3 is continued to be performed.

It is determined that the NDI bit of the corresponding HARQ process is flipped; the configured UL grant and corresponding HARQ information are delivered to the HARQ entity.

In addition, as another implementation, for a dynamic grant resource, if the target HARQ process is a process configured for a configured grant resource or the target HARQ process is the same as that configured for a configured grant resource, and if the third condition is met, the configured Grant Timer of the corresponding HARQ process is started or restarted.

Therefore, according to the method for transmitting data of the implementations of the present disclosure, regarding a scenario where multiple grants conflict in time domain, for example, in a case that an MAC entity generates one MAC PDU for each grant, but only one MAC PDU is to be transmitted finally, according to different conditions, it may be selected to reassemble and then send the untransmitted MAC PDU, or to directly use a new resource for transmission, which solves problems that how the MAC entity determines the transmission situation of the MAC PDU and determines how to process the MAC PDU, ensuring integrity of protocol flow processing, clarifying processing behavior of the UE, avoiding unnecessary packet loss, ensuring QoS of services as much as possible, and maintaining use experience of services of a UE.

Figure 5:
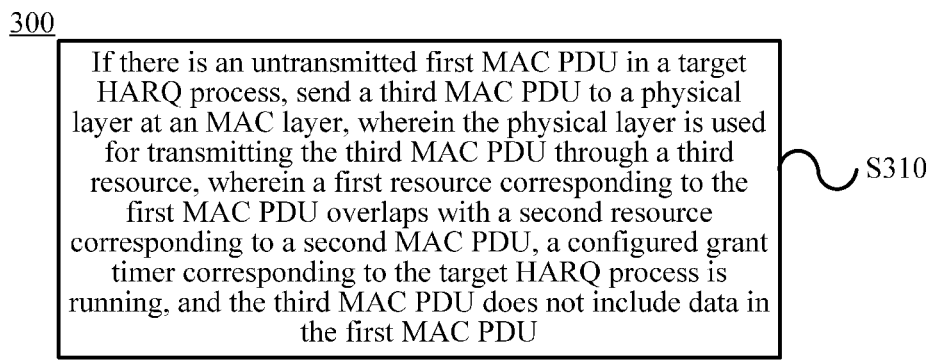
FIG. 5 is a schematic flowchart of another method for transmitting data according to an implementation of the present disclosure.

Optionally, in the above method 200, if there is an untransmitted MAC PDU in the target HARQ process, the terminal device may use another resource to send data in the untransmitted MAC PDU. Contrary to this case, the terminal device may also not send the data in the MAC PDU. Specifically, FIG. 5 is a schematic flowchart of another method for transmitting data 300 according to an implementation of the present disclosure. The method 300 may be performed by a terminal device, for example, the terminal device may be the terminal device shown in FIG. 1. Specifically, the method 300 may be performed by an MAC entity included in the terminal device, in other words, the method 300 may be performed at an MAC layer of the terminal device. Specifically, as shown in FIG. 5, the method 300 includes: S310, if there is an untransmitted first MAC PDU in a target HARQ process, a third MAC PDU is sent to a physical layer at an MAC layer, wherein the physical layer is used for transmitting the third MAC PDU through a third resource, wherein a first resource corresponding to the first MAC PDU overlaps with a second resource corresponding to a second MAC PDU, a configured grant timer corresponding to the target HARQ process is running, and the third MAC PDU does not include data in the first MAC PDU. Further, the third MAC PDU does not include an MAC CE in the first MAC PDU.

It should be understood that the first resource, the second resource and the third resource in the method 300 are the same as those in the above-mentioned method 200, which will not be repeated here for sake of brevity.

It should be understood that if the configured grant timer corresponding to the target HARQ process is running, generally if the first resource and/or the third resource are configured grant resources, the configured grant timer corresponding to the target HARQ process is running, but the implementations of the present disclosure are not limited thereto. Optionally, similar to the method 200, the method 300 further includes: the first MAC PDU and the second MAC PDU are generated at the MAC layer; the second MAC PDU is sent to the physical layer at the MAC layer, wherein the physical layer is used for transmitting the second MAC PDU through a second resource; or, the method 300 may further include: the first MAC PDU is sent to the physical layer at the MAC layer, but the physical layer does not send the first MAC PDU. For sake of brevity, details are not repeated here.

In addition, the method 300 further includes: if the configured grant timer corresponding to the target HARQ process is running, it is determined at the MAC layer that a New Data Indication (NDI) corresponding to the target HARQ process is flipped, and/or if the configured grant timer corresponding to the target HARQ process is running, the third resource is sent to the HARQ entity at the MAC layer, such that the HARQ entity sends the third MAC PDU which does not include the data in the first MAC PDU through the physical layer.

In addition, in the method 300, the case where the configured Grant Timer corresponds to the HARQ process may not be defined. That is, the target HARQ process may be a process different from a HARQ process calculated with the configured Grant. That is, another method 300 includes: S310, if there is an untransmitted first MAC PDU in a target HARQ process, sending a third MAC PDU to a physical layer at an MAC layer, wherein the physical layer is used for transmitting the third MAC PDU through a third resource, wherein, a first resource corresponding to the first MAC PDU overlaps with a second resource corresponding to a second MAC PDU, a configured grant timer corresponding to the target HARQ process is running, and the third MAC PDU does not include data in the first MAC PDU. Further, the third MAC PDU does not include MAC CE in the first MAC PDU.

In Release 16, there may be multiple types of scenarios where grants conflict with each other in the time domain. Due to complex scenarios and various solutions, there are cases where the MAC entity generates one MAC PDU for each grant, but only one MAC PDU is transmitted finally. Moreover, the MAC entity may not know which MAC PDU is transmitted/not transmitted, at this time how to determine the MAC PDU which is generated but not transmitted, and process this MAC PDU are not taken into consideration in the current protocol. In addition, such conflicts occur at times, and if this untransmitted MAC PDU is directly discarded, it is very likely to cause a large amount of services that should be transmitted to be discarded, which leads to the problem that the QoS of the services cannot be met, which reduces use experience of services of the UE. For example, URLLC service 2 is in UM mode, and assembled in the MAC PDU, direct packet discarding causes that the data cannot be recovered, the QoS cannot be met, and survival time cannot be ensured (for example if the former and the latter packets are both lost, the transmission of services will go wrong. Therefore, the method for transmitting data of implementations of the present disclosure provides a solution for the above scenarios, for example, which solves problems that how the MAC entity determines the transmission situation of the MAC PDU and determines how to process the MAC PDU, thereby ensuring integrity of protocol flow processing, clarifying processing behavior of the UE, being able to avoid unnecessary packet loss, ensuring QoS of services as much as possible, and maintaining use experience of services of the UE.

It should be understood that in various implementations of the present disclosure, sequence numbers of the above various processes do not imply an order of execution of the various processes, which should be determined by their functions and internal logics, and should not constitute any limitation on implementation processes of the implementations of the present disclosure.

In addition, the term "and/or" in this specification describes only an association relation for describing associated objects and represents that three relations may exist. For example, A and/or B may represent following three cases: only A exists, both A and B exist, and only B exists. In addition, the symbol "/" in this document generally indicates that objects before and after the symbol "/" have an "or" relation.

The methods for transmitting data according to the implementations of the present disclosure is described in detail above with reference to FIG. 1 to FIG. 5. A terminal device according to implementations of the present disclosure will be described below with reference to FIG. 6 to FIG. 9.

Figure 6:
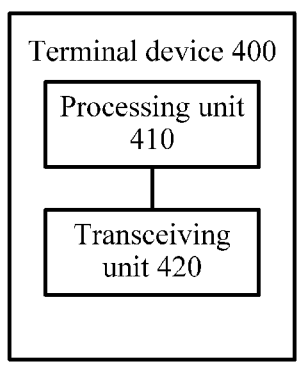
FIG. 6 is a schematic block diagram of a terminal device according to an implementation of the present disclosure.

As shown in FIG. 6, a terminal device 400 according to an implementation of the present disclosure includes: a processing unit 410 and a transceiving unit 420. Specifically, the transceiving unit 420 is configured to send a third MAC PDU to a physical layer at an MAC layer, if there is an untransmitted first MAC PDU in a target HARQ process, wherein the physical layer is used for transmitting the third MAC PDU through a third resource, wherein, a first resource corresponding to the first MAC PDU overlaps with a second resource corresponding to a second MAC PDU, a configured grant timer corresponding to the target HARQ process is running, and the third MAC PDU does not include data in the first MAC PDU.

Optionally, as an implementation, the processing unit 410 is configured to generate the first MAC PDU and the second MAC PDU at the MAC layer. The transceiving unit 420 is further configured to send the second MAC PDU to the physical layer at the MAC layer, wherein the physical layer is used for transmitting the second MAC PDU through the second resource.

Optionally, as an implementation, the transceiving unit 420 is further configured to send the first MAC PDU to the physical layer at the MAC layer.

Optionally, as an implementation, data in the first MAC PDU includes an MAC SDU in the first MAC PDU.

Optionally, as an implementation, the processing unit 410 is configured to obtain the third MAC PDU after the MAC layer reassembles the first MAC PDU.

Optionally, as an implementation, the processing unit 410 is further configured to obtain the third MAC PDU, after the MAC layer reassembles the first MAC PDU through an MAC multiplexing and assembly entity at the MAC layer.

Optionally, as an implementation, the third MAC PDU includes at least one MAC subPDU(s), wherein the at least one MAC subPDU(s) includes the MAC SDU in the first MAC PDU.

Optionally, as an implementation, the processing unit 410 is further configured to obtain the third MAC PDU, after the MAC layer reassembles the first MAC PDU if a first condition is met; wherein the first condition includes at least one of following conditions: a size of the third resource does not match a size of the first MAC PDU; according to a first TB in the target HARQ process, it is determined that the New Data Indication (NDI) corresponding to the target HARQ process is flipped, wherein the first TB corresponds to the first resource; it is determined that there is the untransmitted first MAC PDU in the target HARQ process; the first resource corresponding to the first MAC PDU which exists in the target HARQ process is not transmitted; it is determined that the first resource overlaps with the second resource; the NDI corresponding to the target HARQ process is flipped; the first TB in the target HARQ process is not transmitted; indication information sent by the physical layer is received at the MAC layer, wherein the indication information indicates that the first MAC PDU in the target HARQ process is not transmitted; the first resource and/or the third resource are configured grant resources; the configured grant timer corresponding to the target HARQ process is running; a priority of the third resource is higher than a priority of the first resource; the third resource is a preemption resource; a priority of the second resource is higher than the priority of the first resource; the second resource is transmitted prior to the first resource; the HARQ process number corresponding to the first resource and the HARQ process number corresponding to the third resource are same.

Optionally, as an implementation, the third MAC PDU is the first MAC PDU, or the third MAC PDU includes the first MAC PDU and a padding bit.

Optionally, as an implementation, the transceiving unit 420 is configured to send the third MAC PDU to the physical layer at the MAC layer if a second condition is met, wherein the second condition includes at least one of following conditions: the size of the third resource does not match the size of the first MAC PDU; according to a first TB in the target HARQ process, it is determined that the NDI corresponding to the target HARQ process is flipped, wherein the first TB corresponds to the first resource; it is determined that there is the untransmitted first MAC PDU in the target HARQ process; the first resource corresponding to the first MAC PDU which exists in the target HARQ process is not transmitted; it is determined that the first resource overlaps with the second resource; indication information sent by the physical layer is received at the MAC layer, wherein the indication information indicates that the first MAC PDU in the target HARQ process is not transmitted; the first resource and/or the third resource are configured grant resources; the configured grant timer corresponding to the target HARQ process is running; the NDI corresponding to the target HARQ process is flipped; the first TB in the target HARQ process is not transmitted; the priority of the third resource is higher than the priority of the first resource; the third resource is a preemption resource; the priority of the second resource is higher than the priority of the first resource; the second resource is transmitted prior to the first resource; the HARQ process number corresponding to the first resource and the HARQ process number corresponding to the third resource are same.

Optionally, as an implementation, the configured grant timer corresponding to the target HARQ process is running, and the processing unit 410 is configured to determine at the MAC layer that the NDI corresponding to the target HARQ process is flipped if a third condition is met, and/or send the third resource to the HARQ entity at the MAC layer.

Herein, the third condition includes at least one of following conditions: the first resource and/or the third resource are configured grant resources; it is determined there is the untransmitted first MAC PDU in the target HARQ process; the first resource corresponding to the first MAC PDU which exists in the target HARQ process is not transmitted; it is determined that the first resource overlaps with the second resource; the first TB in the target HARQ process is not transmitted; the priority of the second resource is higher than the priority of the first resource; the second resource is transmitted prior to the first resource; the priority of the third resource is higher than the priority of the first resource; the third resource is a preemption resource; the HARQ process number corresponding to the first resource and the HARQ process number corresponding to the third resource are same.

Optionally, as an implementation, if the NDI corresponding to the target HARQ process is not flipped, the third MAC PDU is the first MAC PDU.

It should be understood that according to what is described above, the terminal device 400 of the implementation of the present disclosure may correspondingly perform the method 200 in the implementations of the present disclosure, and the above operations and/or functions and other operations and/or functions of various units in the terminal device 400 are respectively for realizing corresponding processes of the terminal device of the various methods in FIG. 1 to FIG. 4, which will not be repeated here for sake of brevity.

Optionally, the terminal device 400 in the implementation of the present disclosure may also be configured to perform following acts. Specifically, the transceiving unit 420 is configured to send a third MAC PDU to a physical layer at an MAC layer, if there is the untransmitted first MAC PDU in the target HARQ process, wherein the physical layer is used for transmitting the third MAC PDU through a third resource, wherein a first resource corresponding to the first MAC PDU overlaps with a second resource corresponding to a second MAC PDU, a configured grant timer corresponding to the target HARQ process is running, and the third MAC PDU does not include data in the first MAC PDU.

Optionally, as an implementation, the first resource and/or the third resource are configured grant resources.

Optionally, as an implementation, the processing unit 410 is configured to generate the first MAC PDU and the second MAC PDU at the MAC layer. The transceiving unit 420 is further configured to send the second MAC PDU to the physical layer at the MAC layer, wherein the physical layer is used for transmitting the second MAC PDU through the second resource.

Optionally, as an implementation, the transceiving unit 420 is further configured to send the first MAC PDU to the physical layer at the MAC layer.

Optionally, as an implementation, the processing unit 410 is configured to determine at the MAC layer that the New Data Indication (NDI) corresponding to the target HARQ process is flipped, if the configured grant timer corresponding to the target HARQ process is running; and/or the transceiving unit 420 is further configured to send the third resource to the HARQ entity at the MAC layer, if the configured grant timer corresponding to the target HARQ process is running.

It should be understood that according to what is described above, the terminal device 400 of the implementation of the present disclosure may also corresponds to performing the method 300 in the implementations of the present disclosure, and the above operations and/or functions and other operations and/or functions of various units in the terminal device 400 are respectively for realizing corresponding processes of the terminal device of the various methods in FIG. 5, which will not be repeated here for sake of brevity.

Therefore, with the terminal device of the implementations of the present disclosure, for a scenario where multiple grants conflict in the time domain, in a case that an MAC entity generates one MAC PDU for each grant, but only one MAC PDU is to be transmitted finally, according to different conditions, it may be selected to reassemble and then send the untransmitted MAC PDU, or to directly use a new resource for transmission, which solves a problem that an MAC entity determines a transmission situation of an MAC PDU and determines how to process the MAC PDU, ensures integrity of protocol flow processing, and clarifies processing behavior of a UE, which can avoid unnecessary packet loss, ensure QoS of a service as much as possible, and maintain use experience of a service of a UE.

Figure 7:
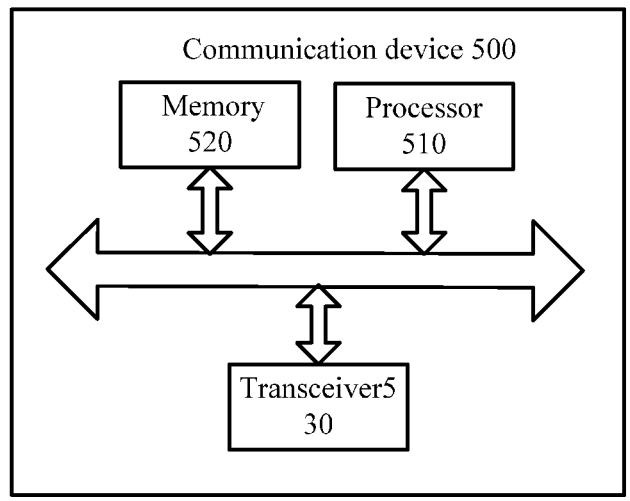
FIG. 7 is a schematic block diagram of a communication device according to an implementation of the present disclosure.

FIG. 7 is a schematic structural diagram of a communication device 500 according to an implementation of the present disclosure. A communication device 500 shown in FIG. 7 includes a processor 510, wherein the processor 510 may call and run a computer program from a memory to implement the method in the implementation of the present disclosure.

Optionally, as shown in FIG. 7, the communication device 500 may further include a memory 520. Herein, the processor 510 may call and run a computer program from the memory 520 to implement the method in the implementation of the present disclosure.

Herein, the memory 520 may be a separate device independent of the processor 510 or may be integrated in the processor 510.

Optionally, as shown in FIG. 7, the terminal device 500 may further include a transceiver 530, and the processor 510 may control the transceiver 530 to communicate with another device. Specifically, information or data may be sent to another device, or information or data sent by another device is received.

Herein, the transceiver 530 may include a transmitter and a receiver. The transceiver 530 may also further include antennas, wherein a quantity of the antennas may be one or more.

Optionally, the communication device 500 may specifically be a network device of an implementation of the present disclosure, and the communication device 500 may implement the corresponding processes implemented by the network device in various methods of the implementations of the present disclosure, which will not be repeated here for sake of brevity.

Optionally, the communication device 500 may be specifically a mobile terminal/terminal device of an implementation of the present disclosure, and the communication device 500 may implement the corresponding processes implemented by the mobile terminal/terminal device in the various methods of the implementations of the present disclosure, which will not be repeated here for sake of brevity.

Figure 8:
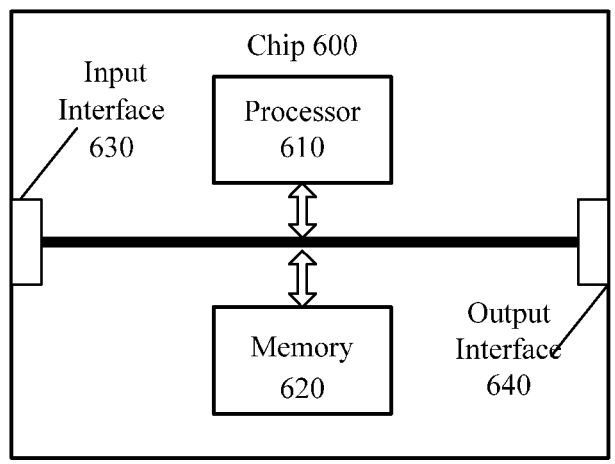
FIG. 8 is a schematic block diagram of a chip according to an implementation of the present disclosure.

FIG. 8 is a schematic structural diagram of a chip of an implementation of the present disclosure. A chip 600 shown in FIG. 8 includes a processor 610, wherein the processor 610 may call and run a computer program from a memory to implement the method in the implementation of the present disclosure.

Optionally, as shown in FIG. 8, the chip 600 may further include a memory 620. Herein, the processor 610 may call and run a computer program from the memory 620 to implement the method in the implementation of the present disclosure.

Herein the memory 620 may be a separate device independent of the processor 610, or may be integrated in the processor 610.

Optionally, the chip 600 may further include an input interface 630. Herein, the processor 610 may control the input interface 630 to communicate with another device or chip. Specifically, information or data sent by another device or chip may be acquired.

Optionally, the chip 600 may further include an output interface 640. Herein, the processor 610 may control the output interface 640 to communicate with another device or chip. Specifically, information or data may be outputted to another device or chip.

Optionally, the chip may be applied to a network device in the implementation of the present disclosure, and the chip may implement the corresponding processes implemented by the network device in various methods of the implementation of the present disclosure, which will not be repeated here for sake of brevity.

Optionally, the chip may be applied to a mobile terminal/terminal device in the implementation of the present disclosure, and the chip may implement the corresponding processes implemented by the mobile terminal/terminal device in the various methods of the implementation of the present disclosure, which will not be repeated here for sake of brevity.

It should be understood that the chip mentioned in the implementation of the present disclosure may also be referred to as a system-level chip, a system chip, a chip system or a system chip-on-chip, etc.

Figure 9:
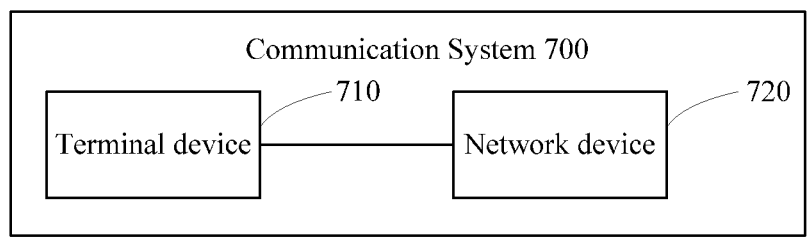
FIG. 9 is a schematic diagram of a communication system according to an implementation of the present disclosure.

FIG. 9 is a schematic block diagram of a communication system 700 according to an implementation of the present disclosure. As shown in FIG. 9, the communication system 700 may include a terminal device 710 and a network device 720.

Herein, the terminal device 710 may be configured to implement the corresponding functions implemented by the terminal device in the above-mentioned methods, and the network device 720 may be configured to implement the corresponding functions implemented by the network device in the above-mentioned methods, which will not be repeated here.

It should be understood that, the processor in the implementations of the present disclosure may be an integrated circuit chip having a signal processing capability. In an implementation process, the acts of the foregoing method implementations may be accomplished through an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, discrete gate or transistor logic device, or a discrete hardware component. The methods, acts and logical block diagrams disclosed in the implementations of the present disclosure may be implemented or executed. The general purpose processor may be a microprocessor, or the processor may be any conventional processor or the like. The acts of methods disclosed with reference to the implementations of the present disclosure may be directly embodied as being executed and accomplished by a hardware decoding processor, or may be executed and accomplished by a combination of hardware and software modules in the decoding processor. The software modules may be located in a storage medium commonly used in the art, such as a random memory, a flash memory, a read-only memory, a programmable read-only memory or an electrically erasable programmable memory, or a register, etc. The storage medium is located in a memory, and the processor reads information in the memory and accomplishes the acts of the above methods in combination with hardware thereof.

It may be understood that, the memory in the implementations of the present disclosure may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which serves as an external cache. As an exemplary but not limitative description, many forms of RAMs are available, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DR RAM). It should be noted that the memory in the systems and the methods described in this specification are intended to include, but not limited to, these and any memory of another suitable type.

It should be understood that, the foregoing memory is exemplary but not limitative description. For example, the memory in the implementations of the present disclosure may also be a static RAM (SRAM), a dynamic RAM (DRAM), a synchronous DRAM (SDRAM), a double data Rate SDRAM (DDR SDRAM), an enhanced SDRAM (ESDRAM), a Synch link DRAM (SLDRAM), or a Direct Rambus RAM (DR RAM), or the like. That is, memories in the implementations of the present disclosure are intended to include, but not limited to, these and any memory of another suitable type.

An implementation of the present disclosure further provides a computer readable storage medium, configured to store a computer program.

Optionally, the computer readable storage medium may be applied in a network device in an implementation of the present disclosure, and the computer program causes a computer to perform the corresponding processes implemented by the network device in various methods of the implementations of the present disclosure, which will not be repeated here for sake of brevity.

Optionally, the computer readable storage medium may be applied in a mobile terminal/terminal device in an implementation of the present disclosure, and the computer program causes the computer to perform the corresponding processes implemented by the mobile terminal/terminal device in various methods of the implementations of the present disclosure, which will not be repeated here for sake of brevity.

An implementation of the present disclosure further provides a computer program product, including computer program instructions.

Optionally, the computer program product may be applied in a network device in an implementation of the present disclosure, and the computer program instructions cause a computer to perform the corresponding processes implemented by the network device in various methods of the implementations of the present disclosure, which will not be repeated here for sake of brevity.

Optionally, the computer program product may be applied in a mobile terminal/terminal device of the implementation of the present disclosure, and the computer program instructions cause a computer to perform the corresponding processes implemented by the mobile terminal/terminal device in various methods of the implementations of the present disclosure, which will not be repeated here for sake of brevity.

An implementation of the present disclosure further provides a computer program.

Optionally, the computer program may be applied in a network device of an implementation of the present disclosure. When the computer program is run on a computer, the computer is caused to perform the corresponding processes implemented by the network device in various methods of the implementations of the present disclosure, which will not be repeated here for sake of brevity.

Optionally, the computer program may be applied in a mobile terminal/terminal device of an implementation of the present disclosure. When the computer program is run on a computer, the computer is caused to perform the corresponding processes implemented by the mobile terminal/terminal device in various methods of the implementations of the present disclosure, which will not be repeated here for sake of brevity.

Those of ordinary skills in the art may recognize that the exemplary elements and algorithm acts described in combination with the implementations disclosed herein can be implemented in electronic hardware, or a combination of computer software and electronic hardware. Whether these functions are performed in hardware or software depends on the specific application and design constraint conditions of the technical solution. Skilled artisans may use different methods to implement the described functions in respect to each particular application, but such implementation should not be considered to be beyond the scope of the present disclosure.

Those skilled in the art may clearly learn that for convenience and conciseness of description, the specific working processes of the systems, apparatuses and units described above may refer to the corresponding processes in the foregoing method implementations, which will not be repeated here.

In several implementations according to the present disclosure, it should be understood that the disclosed systems, apparatuses and methods may be implemented in another manner. For example, the apparatus implementations described above are only illustrative, for example, the division of the units is only a logical function division, and there may be another division manner in an actual implementation, for example, multiple units or components may be combined or integrated into another system, or some features may be ignored or not performed. On the other hand, the mutual coupling or direct coupling or a communication connection shown or discussed may be indirect coupling or a communication connection through some interfaces, apparatuses or units, and may be in electrical, mechanical or another form.

The unit described as a separate component may or may not be physically separated, and the component shown as a unit may or may not be a physical unit, i.e., it may be located in one place, or may be distributed over multiple network units. A part or all of the units therein may be selected according to an actual need to achieve the purpose of solutions of the implementations.

In addition, various functional units in various implementations of the present disclosure may be integrated in one processing unit, or the various units may be physically present separately, or two or more units may be integrated in one unit.

The functions may be stored in a computer readable storage medium, if realized in a form of software functional units and sold or used as a separate product. Regarding such understanding, the technical solution of the present disclosure, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present disclosure. And the foregoing storage medium includes: various kinds of media that may store program codes, such as a USB flash drive, a removable hard disk, a Read-Only Memory (ROM), a Random Access Memory (RAM), a magnetic disk, or an optical disc, etc.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for transmitting data, comprising:
   sending a third Media Access Control (MAC) Protocol Data Unit (PDU) to a physical layer at an MAC layer, if there is a first MAC PDU not being transmitted in a target Hybrid Automatic Repeat reQuest (HARQ) process,
   wherein, a first resource corresponding to the first MAC PDU overlaps with another resource, the third MAC PDU comprises data in the first MAC PDU, and the physical layer is used for transmitting the third MAC PDU through a third resource;
   wherein that the third MAC PDU comprises data in the first MAC PDU comprises:
   the third MAC PDU is the first MAC PDU;
   wherein sending the third MAC PDU to the physical layer at the MAC layer comprises:
   sending the third MAC PDU to the physical layer at the MAC layer, if a second condition is met, wherein the second condition comprises at least one of following conditions:
   a size of the third resource matches a size of the first MAC PDU;
   according to a first TB in the target HARQ process, it is determined that a NDI corresponding to the target HARQ process is flipped, wherein the first TB corresponds to the first resource;
   it is determined that there is the first MAC PDU not being transmitted in the target HARQ process;
   the first resource and/or the third resource are configured grant resources;
   the second resource is transmitted prior to the first resource; or
   a HARQ process number corresponding to the first resource and a HARQ process number corresponding to the third resource are the same.

2. The method of claim 1, further comprising:
   generating the first MAC PDU and the second MAC PDU at the MAC layer; and
   sending the second MAC PDU to the physical layer at the MAC layer, wherein the physical layer is used for transmitting the second MAC PDU through the second resource.

3. The method of claim 1, further comprising:
   sending the first MAC PDU to the physical layer at the MAC layer.

4. The method of claim 1, wherein the data in the first MAC PDU comprises an MAC Service Data Unit (SDU) in the first MAC PDU.

5. The method of claim 4, further comprising:
   obtaining the third MAC PDU after the MAC layer reassembles the first MAC PDU.

6. The method of claim 5, wherein obtaining the third MAC PDU after the MAC layer reassembles the first MAC PDU, comprises:
   obtaining the third MAC PDU after the MAC layer reassembles the first MAC PDU through an MAC multiplexing assembly entity.

7. The method of claim 6, wherein the third MAC PDU comprises at least one MAC subPDU, wherein the at least one MAC subPDU comprises the MAC SDU in the first MAC PDU.

8. The method of claim 5, wherein obtaining the third MAC PDU after the MAC layer reassembles the first MAC PDU, comprises:
   obtaining the third MAC PDU after the MAC layer reassembles the first MAC PDU, if a first condition is met;
   wherein, the first condition comprises at least one of following conditions:
   a size of the third resource does not match a size of the first MAC PDU;
   according to a first Transport Block (TB) in the target HARQ process, it is determined that a New Data Indication (NDI) corresponding to the target HARQ process is flipped, wherein the first TB corresponds to the first resource;

it is determined that there is the first MAC PDU not being transmitted in the target HARQ process;
the first resource corresponding to the first MAC PDU which exists in the target HARQ process is not transmitted;
it is determined that the first resource overlaps with the second resource;
the NDI corresponding to the target HARQ process is flipped;
the first TB in the target HARQ process is not transmitted;
indication information sent by the physical layer is received at the MAC layer, wherein the indication information indicates that the first MAC PDU in the target HARQ process is not transmitted;
the first resource and/or the third resource are configured grant resources;
a configured grant timer corresponding to the target HARQ process is running;
a priority of the third resource is higher than a priority of the first resource;
the third resource is a preemption resource;
a priority of the second resource is higher than the priority of the first resource;
the second resource is transmitted prior to the first resource; or
a HARQ process number corresponding to the first resource and a HARQ process number corresponding to the third resource are same.

9. The method of claim 1, wherein the third resource is a configured grant resource.

10. A terminal device, comprising: a processor, a memory, and a transceiver, wherein the memory is configured for storing a computer program, the transceiver is configured to communicate with another device under control of the processor, and the processor is configured for executing the computer program from the memory to:
send, through the transceiver, a third Media Access Control (MAC) Protocol Data Unit (PDU) to a physical layer at an MAC layer, if there is a first MAC PDU not being transmitted in a target Hybrid Automatic Repeat reQuest (HARQ) process,
wherein, a first resource corresponding to the first MAC PDU overlaps with another resource, the third MAC PDU comprises data in the first MAC PDU, and the physical layer is used for transmitting the third MAC PDU through a third resource;
wherein that the third MAC PDU comprises data in the first MAC PDU comprises:
the third MAC PDU is the first MAC PDU;
wherein the processor is further configured for executing the computer program from the memory to:
send, through the transceiver, the third MAC PDU to the physical layer at the MAC layer if a second condition is met, wherein the second condition comprises at least one of following conditions:
a size of the third resource matches a size of the first MAC PDU;
according to a first TB in the target HARQ process, it is determined that a NDI corresponding to the target HARQ process is flipped, wherein the first TB corresponds to the first resource;
it is determined that there is the first MAC PDU not being transmitted in the target HARQ process;
the first resource and/or the third resource are configured grant resources;
the second resource is transmitted prior to the first resource; or
a HARQ process number corresponding to the first resource and a HARQ process number corresponding to the third resource are the same.

11. The terminal device of claim 10, wherein the processor is configured for executing the computer program from the memory to:
generate the first MAC PDU and the second MAC PDU at the MAC layer; and
send, through the transceiver, the second MAC PDU to the physical layer at the MAC layer, wherein the physical layer is used for transmitting the second MAC PDU through the second resource.

12. The terminal device of claim 10, wherein the processor is configured for executing the computer program from the memory to:
send, through the transceiver, the first MAC PDU to the physical layer at the MAC layer.

13. The terminal device of claim 10, wherein the data in the first MAC PDU comprises an MAC Service Data Unit (SDU) in the first MAC PDU.

14. The terminal device of claim 13, wherein the processor is configured for executing the computer program from the memory to:
obtain the third MAC PDU after the MAC layer reassembles the first MAC PDU.

15. The terminal device of claim 14, wherein the processor is configured for executing the computer program from the memory to:
obtain the third MAC PDU after the MAC layer reassembles the first MAC PDU through an MAC multiplexing assembly entity.

16. The terminal device of claim 14, wherein the third MAC PDU comprises at least one MAC subPDU, wherein the at least one MAC subPDU comprises the MAC SDU in the first MAC PDU.

17. The terminal device of claim 14, wherein the processor is configured for executing the computer program from the memory to:
obtain the third MAC PDU after the MAC layer reassembles the first MAC PDU if a first condition is met;
wherein, the first condition comprises at least one of following conditions:
a size of the third resource does not match a size of the first MAC PDU;
according to a first Transport Block (TB) in the target HARQ process, it is determined that a New Data Indication (NDI) corresponding to the target HARQ process is flipped, wherein the first TB corresponds to the first resource;
it is determined that there is the first MAC PDU not being transmitted in the target HARQ process;
the first resource corresponding to the first MAC PDU which exists in the target HARQ process is not transmitted;
it is determined that the first resource overlaps with the second resource;
the NDI corresponding to the target HARQ process is flipped;
the first TB in the target HARQ process is not transmitted;
indication information sent by the physical layer is received at the MAC layer, wherein the indication information indicates that the first MAC PDU in the target HARQ process is not transmitted;
the first resource and/or the third resource are configured grant resources;
a configured grant timer corresponding to the target HARQ process is running;

a priority of the third resource is higher than a priority of the first resource;

the third resource is a preemption resource;

a priority of the second resource is higher than the priority of the first resource;

the second resource is transmitted prior to the first resource; or a HARQ process number corresponding to the first resource and a HARQ process number corresponding to the third resource are same.

18. The terminal device of claim 10, wherein the third resource is a configured grant resource.

19. The terminal device of claim 10, wherein the configured grant timer corresponding to the target HARQ process is running, and the processor is configured for executing the computer program from the memory to determine at the MAC layer that the NDI corresponding to the target HARQ process is flipped, and/or send the third resource to a HARQ entity at the MAC layer if a third condition is met, wherein the third condition comprises at least one of following conditions:

the first resource and/or the third resource are configured grant resources;

it is determined that there is the first MAC PDU not being transmitted in the target HARQ process;

the first resource corresponding to the first MAC PDU which exists in the target HARQ process is not transmitted;

it is determined that the first resource overlaps with the second resource;

the first TB in the target HARQ process is not transmitted;

the priority of the second resource is higher than the priority of the first resource;

the second resource is transmitted prior to the first resource;

the priority of the third resource is higher than the priority of the first resource;

the third resource is a preemption resource; or a HARQ process number corresponding to the first resource and a HARQ process number corresponding to the third resource are same.

20. A non-transitory computer readable storage medium, configured to store a computer program, wherein the computer program causes a computer to:

send a third Media Access Control (MAC) Protocol Data Unit (PDU) to a physical layer at an MAC layer, if there is a first MAC PDU not being transmitted in a target Hybrid Automatic Repeat reQuest (HARQ) process, wherein, a first resource corresponding to the first MAC PDU overlaps with another resource, the third MAC PDU comprises data in the first MAC PDU, and the physical layer is used for transmitting the third MAC PDU through a third resource;

wherein that the third MAC PDU comprises data in the first MAC PDU comprises:

the third MAC PDU is the first MAC PDU;

wherein the computer program further causes the computer to:

send the third MAC PDU to the physical layer at the MAC layer if a second condition is met, wherein the second condition comprises at least one of following conditions:

a size of the third resource matches a size of the first MAC PDU;

according to a first TB in the target HARQ process, it is determined that a NDI corresponding to the target HARQ process is flipped, wherein the first TB corresponds to the first resource;

it is determined that there is the first MAC PDU not being transmitted in the target HARQ process;

the first resource and/or the third resource are configured grant resources;

the second resource is transmitted prior to the first resource; or a HARQ process number corresponding to the first resource and a HARQ process number corresponding to the third resource are the same.

* * * * *